United States Patent [19]

Caveza et al.

[11] Patent Number: 5,314,338
[45] Date of Patent: May 24, 1994

[54] SHAPE-MATCHING SPIN-ACTION TOY

[75] Inventors: Martin J. Caveza, Redondo Beach; Derek Gable, Palos Verdes, both of Calif.

[73] Assignee: Mattel, Inc., El Segundo, Calif.

[21] Appl. No.: 930,580

[22] Filed: Aug. 17, 1992

[51] Int. Cl.⁵ .................. G09B 19/00; A63H 1/06
[52] U.S. Cl. ........................... 434/259; 446/241
[58] Field of Search ............ 446/241, 475, 236, 246; 434/259; 273/145 E, 144 A, 144 R

[56] References Cited

U.S. PATENT DOCUMENTS

| | | | |
|---|---|---|---|
| 2,747,297 | 5/1956 | Zalkind | 434/259 |
| 3,084,478 | 4/1963 | Burger | 446/241 |
| 3,760,511 | 9/1973 | Matsumoto | 434/259 |
| 4,149,717 | 4/1979 | Seijiro | 434/259 X |
| 4,195,421 | 4/1980 | Tucker et al. | 434/259 |
| 4,292,756 | 10/1981 | Jaworski et al. | 446/475 X |
| 4,455,781 | 6/1984 | Blumenthal | 446/241 |
| 4,508,512 | 4/1985 | Girsch et al. | 434/259 |
| 4,609,356 | 9/1986 | Gilden et al. | 434/259 |
| 4,610,637 | 9/1986 | Ferguson | 446/237 |
| 4,822,051 | 4/1989 | Nowak et al. | 273/157 R |

*Primary Examiner*—Mickey Yu
*Attorney, Agent, or Firm*—Roy A. Ekstrand

[57] ABSTRACT

A shape-matching snap-action toy includes a generally cylindrical domed housing formed of a transparent material and having an exit opening defined therein. A plurality of geometrically shaped apertures are formed in the upper portion of the housing and receive correspondingly spaced geometric objects for deposit within the housing interior. A center column supports a rotatable floor within the housing and a spring-biased push button drive mechanism. The drive mechanism includes a helical rod which engages the rotatable center column each time the push button is depressed rotating the center column and floor causing geometric objects within the housing interior to be erratically bounced about the housing interior until randomly thrown outwardly from the housing through an opening formed in the housing wall.

9 Claims, 2 Drawing Sheets

SHAPE-MATCHING SPIN-ACTION TOY

FIELD OF THE INVENTION

This invention relates generally to spin toys and particularly to those utilizing a sorting or shape matching operation.

BACKGROUND OF THE INVENTION

Childrens' toys of the type which use sorting and matching of various geometrically shaped elements to teach young children geometric and spacial relationships have been extremely popular through the years. The matching process usually requires that the child correctly match a geometric object such as a block or the like with the appropriately shaped aperture within the toy housing which then permits insertion of the toy object into the housing. This activity is extremely beneficial to young children and provides early education in spacial and geometric relationships. However, it has been found that young children are not likely to participate in this beneficial activity unless amused and otherwise rewarded for their effort and success.

Faced with this challenge, practitioners in the art have endeavored to provide a variety of stimulating and amusing sorting and matching types toys through the years. For example, U.S. Pat. No. 4,455,781 issued to Blumenthal sets forth a SORTING TOP having a spinable hollow body with entry ports for receiving objects having prescribed configurations. The sorting top further includes a base which is releasable by a spin generating mechanism to allow objects entered into selected entry points to be released from the interior of the spinning body.

U.S. Pat. No. 4,149,717 issued to Seijiro sets forth a PUZZLE BOX having a plurality of holes formed in the sides thereof. In the intended play pattern, players attempt to insert the various corresponding shaped blocks into the box interior through the geometrically shaped holes in the facets of the box.

U.S. Pat. No. 4,195,421 issued to Tucker, et al. sets forth a SHAPE MATCHING DEVICE having a supporting frame and a generally conical container rotatably supported thereon. The container defines a plurality of input apertures shaped and dimensioned to allow insertion into the container of a block or group of associated blocks. The interior surface of the container includes a plurality of curved longitudinal ribs which urge the blocks within the conical container's interior outwardly as the container is rotated.

U.S. Pat. No. 4,822,051 issued to Nowak, et al. sets forth a PICTURE PUZZLE OF MULTIPLE PANELS WITH PROGRESSIVE DIFFICULTY having several discrete puzzle panels progressively rendered more difficult and each including segments of a picture. Each panel includes at least one cavity and a corresponding size and shape sorting puzzle.

U.S. Pat. No. 4,610,637 issued to Ferguson sets forth a TOY VEHICLE HAVING ROTATING ELEMENT in which a toy vehicle defines a concave recess which receives a generally cylindrical drum. The cylindrical drum is operatively coupled to the vehicle wheels and rotates as the vehicle moves. The cylindrical sidewall surface of the drum defines a plurality of geometrically shaped apertures which receive correspondingly shaped block-like objects in a sorting or matching process.

U.S. Pat. No. 4,609,356 issued to Gilden, et al. sets forth a REARRANGEABLE FORM BOARD WITH SENSORY FEEDBACK in which a gameboard housing supports a plurality of geometrically shaped apertures which receive correspondingly shaped play objects. A plurality of switch mechanisms are positioned proximate the apertures to provide closure of the switch mechanism as the correct block-like object is inserted which in turn activates a sound and action producing toy figure to provide positive reinforcement to the child user.

U.S. Pat. No. 4,508,512 issued to Girsch, et al. sets forth a SHAPE-MATCHING TOY APPARATUS WITH SAFETY HINGE having a first plate defining a plurality of differently shaped apertures therein. A plurality of block elements of corresponding shapes are receivable within the apertures. A second plate engages the block elements to push them through the apertures and is hingedly attached to the first plate.

U.S. Pat. No. 3,760,511 issued to Matsumoto sets forth an EDUCATIONAL DEVICE having a housing provided with a plurality of openings of different configurations and correspondingly shaped blocks. The housing is provided with means for closure of the apertures following a predetermined time interval signalling the end of a player's turn.

U.S. Pat. No. 3,084,478 issued to Burger sets forth a POPPING BALL TOP having a frusto-conical housing within which a plurality of spherical objects are captivated. A spinning mechanism operates to spin a plurality of angularly disposed rotatable paddles near the base of the frusto-conical housing. The rotating paddles impact the spherical objects and bounce them about within the housing interior.

A game of skilled distributed by Reed Toys, Inc. West Conshohocken, Pa. sets forth a skill game having a rectangular housing defining a plurality of geometric shape receptacles and having a timer mechanism supported in proximity thereto. A plurality of geometrically shaped tokens corresponding to the shaped recesses are provided with the game object being the accurate placement of the geometric objects within their respective recesses in the fastest time or a specific time allotment.

While the foregoing described sorting and shape-matching toys have proven beneficial and educational to varying degrees of success, there remains nonetheless a continuing need in the art for evermore interesting and amusing sorting and matching-type toys which present sufficient amusement value to stimulate young children to participate.

SUMMARY OF THE INVENTION

Accordingly, it is a general object of the present invention to provide an improved shape-matching toy. It is a more particular object of the present invention to provide an improved shape-matching toy which utilizes a spin-action to increase the amusement value and encourage the participation of the child user.

In accordance with the present invention, there is provided a shape-matching toy comprises: a housing defining an interior cavity, a plurality of geometrically shaped apertures, and an exit opening; a plurality of geometric objects having shapes generally corresponding to the geometrically shaped apertures; a base supporting the housing; a rotatable floor rotatably supported upon the base within the interior cavity; and drive means coupled to the rotatable floor for imparting a rotational force thereto and causing the geometric objects within the interior cavity to be agitated and randomly expelled from the interior cavity through the exit opening.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
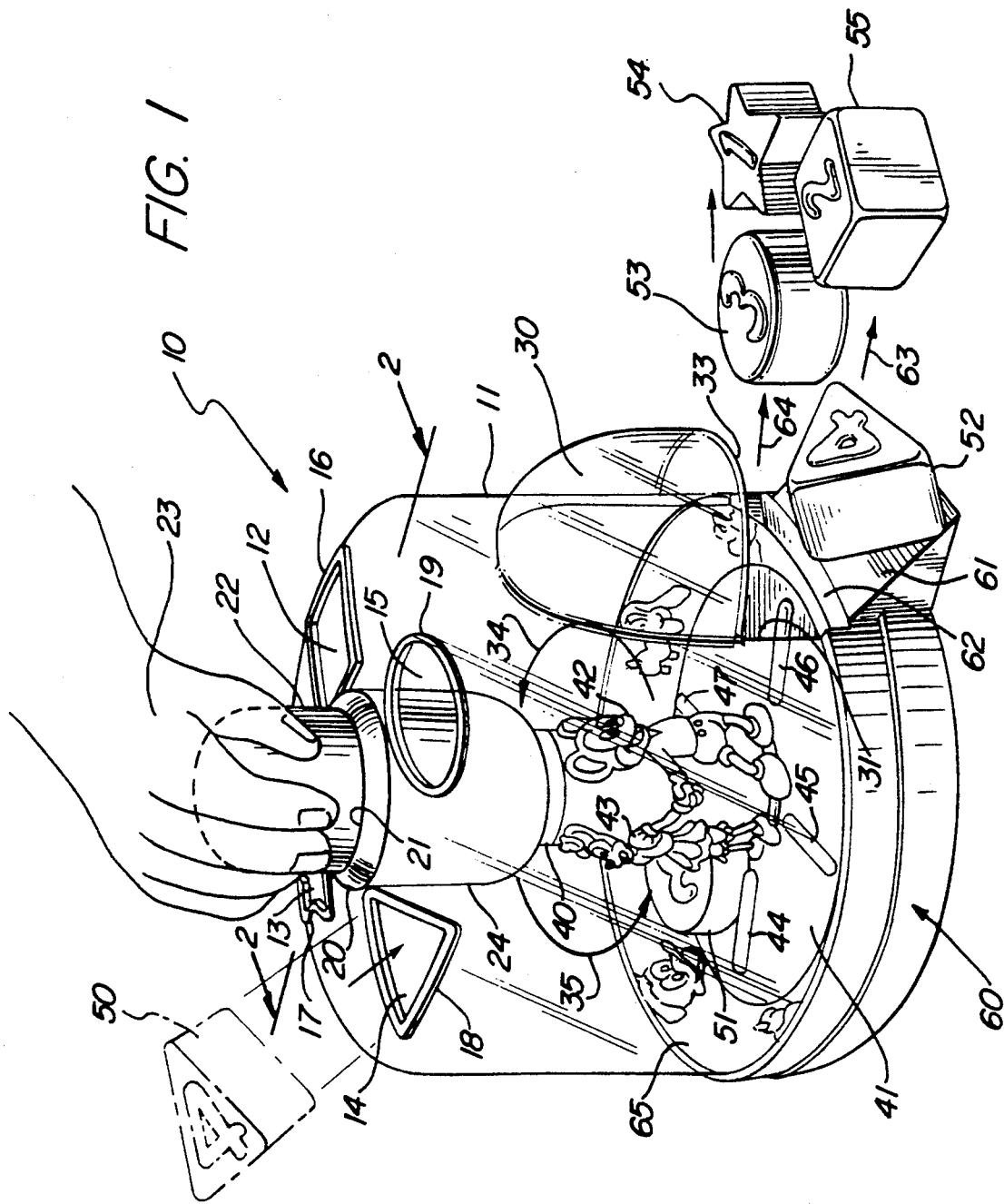
FIG. 1 sets forth a perspective view of a shape-matching spin-action toy constructed in accordance with the present invention.

FIG. 1 sets forth a perspective view of a shape-matching spin-action toy constructed in accordance with the present invention and generally referenced by numeral 10. Toy 10 includes a generally cylindrical domed housing 11 preferably formed of a transparent plastic material or the like. Housing 11 further defines an opening 31 and an outwardly extending dome 30. Dome 30 further defines a lower edge 33 extending across each side of opening 31. Housing Il further defines a plurality of geometrically shaped apertures 12, 13, 14 and 15 in a generally evenly spaced arrangement about the upper surface of housing 11. Apertures 12 through 15 further include frame members 16 through 19 respectively which correspond in shape to apertures 12 through 15 and which are preferably colored with a contrasting color so as to permit apertures 12 through 15 to be readily distinguished from the remainder of housing 11. Housing 11 further defines a center housing 20 having a center aperture 21 defined therein. By means set forth below in greater detail, a generally cylindrical push button 22 is movably supported within aperture 21 of center housing 20.

Figure 2:
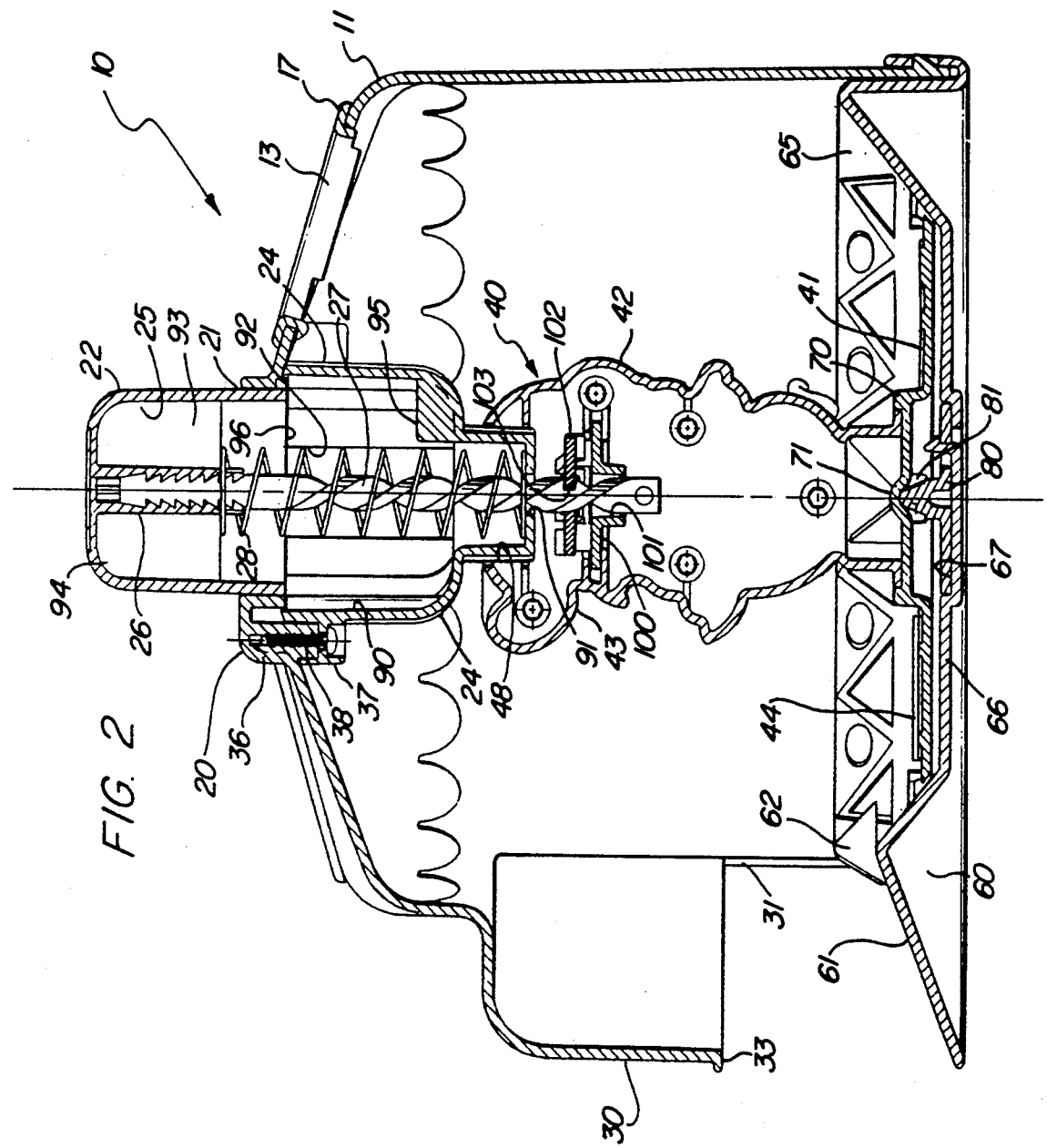
FIG. 2 sets forth a section view of the present invention shape-matching spin-action toy taken along section lines 2-2 in FIG. 1.

A generally circular base 60 defines a downwardly sloped surface 65 and is joined to housing 11 in the manner set forth in FIG. 2. Base 60 further defines a cutout portion 62 corresponding generally to the dimension of opening 31 and a downwardly extending inclined exit ramp 61.

A center column 40 is received within interior housing 24 and, by means set forth below in greater detail, is rotatably supported by base 60. Center column 40 further includes a plurality of simulated toy figures such as FIGS. 42 and 43. A generally horizontal circularly shaped rotating floor 41 is joined to and rotatable with center column 40. Rotating floor 41 further defines a plurality of radially extending raised rib portions 44 through 47.

A plurality of geometrically shaped play objects 50 through 55 define cross-sectional shapes corresponding to selected ones of apertures 12 through 15. In their preferred form, geometrically shaped objects 50 through 55 are similar to play blocks and configured to be readily handled by young children. In addition, in their preferred form, geometric objects 50 through 55 are sized and shaped with sufficient close correspondence to apertures 12 through 15 that each is insertable solely through a corresponding associated aperture and is incapable of being inserted into other apertures within housing 11.

In operation, and by means set forth below in greater detail, the child user selects one of the geometrically shaped objects 50 through 55 and, in accordance with the intended play pattern, associates the correspondingly shaped one of apertures 12 through 15 and, when so doing, successively inserts the geometric object through the appropriate one of apertures 12 through 15 thereby depositing the geometric object within housing 11 upon rotating floor 41. In FIG. 1, it will be seen that geometric object 50 having a triangular shape is insertable into housing 11 through aperture 14. Similarly, it will be seen that object 51 is presently resting upon rotating floor 41. The remaining objects 52 through 55 are shown at the exterior of toy 10.

In accordance with an important aspect of the present invention, the child user is able to place a hand 23 upon push button 22 and force it downwardly. By means set forth below in greater detail, the downward travel of push button 22 causes center column 40 and rotating floor 41 to rotate rapidly in the direction indicated by arrows 34 and 35. During the rotation of floor 41, ribs 44 through 47 act upon objects within housing 11 such as object 51 to force the object outwardly against the inner surface of housing 11. As the rotation continues, objects within housing 11 bounce about in an amusing manner until they by happenstance are thrown outwardly through opening 31 and cutout 62 in the manner shown for geometric object 52 and are thereby expelled from housing 11. Once the child user has successively expelled all the geometric objects, the cycle may be repeated by again matching the geometric object to its corresponding aperture and once again depositing the geometric object within housing 11.

It will be apparent to those skilled in the art that the bouncing action and rapid motion associated with the expelling of geometric objects 50 through 55 from housing 11 provides substantial excitement and entertainment for the child user. This excitement is intended to motivate the child user to endeavor to correctly match the geometric objects with the appropriate aperture and thereby return the objects to the interior of housing Il in order to play the game.

FIG. 2 sets forth a section view of the present invention toy taken along section lines 2—2 in FIG. I. Toy 10 includes a housing 11 defining a plurality of apertures such as aperture 13 in the upper portion thereof. Housing 11 further defines an outwardly extending dome portion 30 defining a lower edge 33. Housing Il further defines an opening 31 extending beneath dome 30 and a center housing 20 extending upwardly and defining a center aperture 21. Housing 20 further defines a plurality of attachment bosses such as boss 36.

Toy 10 further includes an interior housing 24 having a generally cylindrical shape and defining an interior recess 90. Recess 90 further includes a plurality of spring guides 92 and a travel limit member 95. An aperture 91 is formed at the bottom portion of recess 90. A plurality of attachment bosses such as boss 37 are defined about the periphery of interior housing 24 and are aligned with respective bosses such as boss 36 formed in center housing 20. A plurality of fasteners such as fastener 38 are received within boss 37 and boss 36 to form a secure attachment between interior housing 24 and center housing 20. A generally cylindrical upwardly extending push button 2 defines an interior cavity 25 and is received within aperture 21 of center housing 20. Push button 22 further includes a downwardly extending interior boss 26 which receives and supports a helical rod 27. Push button 22 further defines a lower edge 96 and a plurality of inwardly extending support webs 93 and 94. Push button 22 further defines a plurality of outwardly extending tabs such as tab 29 which captivate and retain push button 22 within center housing 20. A compression spring 28 comprises a coil spring 28 which is captivated between the bottom surface of interior housing 24 and support webs 93 and 94 of push button 22. Because spring 28 is maintained in compression, it provides an upwardly directed force urging push button 22 to the fully raised position shown in FIG. 2.

Toy 10 further includes a center column 40 having formed therein a plurality of outwardly extending toy figure simulations such as FIGS. 42 and 43. Column 40 is generally hollow and supports a guide member 100 having a passage 101 formed therein. A slotted plate 102 is secured to guide 100 and supported within column 40. Slotted plate 102 defines an elongated aperture 103. Helical rod 27 extends downwardly from boss 26 through the center of coil spring 28 and aperture 91 formed in interior housing 24. Helical rod 27 extends downwardly from interior housing 24 and passes through aperture 103 in slotted plate 102 and through passage 101 in guide 100.

Base 60 of toy 10 supports housing 11 and defines a generally planar base plate 66 having a bearing recess 67 formed therein. Base 60 further defines an upwardly and outwardly extending sloped surface 65. A cutout portion 62 interrupts sloped surface 65 and is generally coextensive with opening 31 of housing 11. A downwardly inclined exit ramp 61 extends outwardly from cutout portion 62. A bearing 80 is received within bearing recess 67 and defines an upwardly extending center bearing point 81. A rotating floor 41 defines a generally circular planar member having a plurality of upwardly extending ribs 44 through 47 (better seen in FIG. 1). Rotating floor 41 further defines a center riser 70 having a bearing recess 71 formed therein. Bearing recess 71 receives bearing point 81 of bearing 80 and is supported thereby. Riser 70 is secured to the lower portion of center column 40 using conventional attachment means. Center column 40 further defines a passage 48 which receives the lower portion of interior housing 24. Thus, center column 40 and rotating floor 41 are rotatably supported upon bearing point 81 and the lower portion of interior housing 24 and thus are freely rotatable.

In operation, rotating floor 41 and center column 40 are caused to rapidly rotate as the child user forces push button 22 downwardly with respect to center housing 20. The downward force upon push button 22 drives helical rod 27 downwardly through aperture 91 of interior housing 24 and aperture 103 of slotted plate 102 and finally through passage 101 of guide 100. While helical rod 27 moves freely through aperture 91 of interior housing 24 and passage 101 of guide 100 without engagement therewith, aperture 103 is configured to engage helical rod 27 and, as a result, the downward motion of helical rod 27 imparts a rotating or torsional force to slotted plate 102. The rotational force is coupled from slotted plate 102 to center column 40 and rotating floor 41. In accordance with conventional fabrication techniques, aperture 103 and slotted plate 102 are configured to engage helical rod 27 each time helical rod 27 is driven downwardly while releasing or not engaging helical rod 27 as it rises under the urging of spring 28. Thus, but for the engagement which occurs between slotted plate 102 and helical rod 27 during downward motion of helical rod 27, center column 40 and rotating floor 41 are freely rotatable within housing 11.

As a result, toy 10 may be operated in the manner set forth above in FIG. 1 to facilitate the deposit of one or more of the geometrically shaped objects 50 through 55 through the appropriate apertures in the upper portion of housing 11. Thereafter, the geometric objects within housing 11 may be rapidly expelled therefrom by the child user's manipulation of push button 22 to rapidly spin rotating floor 41 and center column 40. As described above, the rapid rotation of rotating floor 41 and center column 40 together with the cooperation of ribs 44 through 47 (seen in FIG. 1) cause the geometric objects within the interior of housing 11 to rapidly accelerate outwardly against the walls of housing 11 until by chance they exit housing 11 through opening 31 and cutout 62.

What has been shown is a novel and exciting shape-matching spin-action toy which utilizes a rotating interior floor within a transparent housing to provide an interesting and amusing interactive operation which encourages the child user to endeavor to deposit geometric objects within the housing. The tendency for geometric objects acted upon by the rotating floor to rapidly and randomly move within the interior of the toy housing provides substantial excitement value for the child user. The limited extent of the exit opening within the housing coupled with the random chance for a particular geometric object to be accelerated outwardly through the opening contributes a challenging aspect to the child user's operation of the toy. All of this excitement combines to further encourage the child user to struggle with the shape-matching operation necessary in order to successfully deposit the geometric objects within the housing interior for eventual discharge through rotation of the housing floor. A downwardly sloped interior surface within the housing base tends to direct and guide bouncing geometric objects within the housing interior to the rotating floor further enhancing the toy operation.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

We claim:

1. A shape-matching toy comprising:
   a housing defining an interior cavity, a plurality of geometrically shaped apertures, and an exit opening;
   a plurality of geometric objects having shapes generally corresponding to said geometrically shaped apertures;
   a base supporting said housing;
   a generally horizontal rotatable floor rotatably supported upon said base within said interior cavity and rotatable with respect to said housing; and
   drive means coupled to said rotatable floor for imparting a rotational force thereto and causing said geometric objects within said interior cavity to be agitated and randomly expelled from said interior cavity through said exit opening.

2. A shape-matching toy as set forth in claim 1 wherein said drive means includes:
 a center column coupled to said rotatable floor;
 a depressible push button supported by said housing;
 a helical drive shaft coupled to said push button;
 engagement means coupled and secured to said center column and engaging said helical drive shaft; and
 spring means urging said push button upwardly.

3. A shape-matching toy as set forth in claim 2 wherein said housing further defines an outwardly extending dome portion above said opening.

4. A shape-matching toy as set forth in claim 3 wherein said base defines a surface surrounding said rotating floor sloped downwardly toward said rotating floor.

5. A shape-matching toy as set forth in claim 4 wherein said base defines a cut out portion beneath said opening in said housing.

6. A shape-matching toy as set forth in claim 5 wherein said base defines an exit ramp having a downwardly sloped outwardly extending ramp surface generally aligned with said opening in said housing.

7. A shape-matching toy as set forth in claim 6 further including a plurality of frame members supported by said housing within said geometrically shaped apertures.

8. A shape-matching toy comprising:
 a housing defining an interior cavity, a plurality of geometrically shaped apertures, and an exit opening;
 a plurality of geometric objects each shaped to pass solely through a single one of said geometrically shaped apertures; and
 rotating means including a horizontally disposed rotatable floor for randomly agitating geometric objects within said interior cavity against said housing and randomly expel said geometric objects outwardly through said exit opening.

9. A shape-matching toy as set forth in claim 8 wherein said housing includes a transparent portion.

* * * * *